(12) United States Patent
Yamaguchi et al.

(10) Patent No.: US 10,581,092 B2
(45) Date of Patent: Mar. 3, 2020

(54) FUEL CELL COOLING SYSTEM ION EXCHANGER HAVING INTRODUCTION DEVICE FOR PARTITIONING COOLANT IN COMMUNICATING PIPE

(71) Applicant: TOYODA GOSEI CO., LTD., Kiyosu-shi, Aichi-ken (JP)

(72) Inventors: Naoki Yamaguchi, Kiyosu (JP); Tatsuya Ojio, Kiyosu (JP); Yoshiki Nakamura, Kiyosu (JP); Takeshi Hattori, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 135 days.

(21) Appl. No.: 15/638,754

(22) Filed: Jun. 30, 2017

(65) Prior Publication Data
US 2018/0013155 A1 Jan. 11, 2018

(30) Foreign Application Priority Data
Jul. 5, 2016 (JP) ................. 2016-133276

(51) Int. Cl.
*H01M 8/04029* (2016.01)
*B01J 47/06* (2006.01)
*H01M 8/0267* (2016.01)

(52) U.S. Cl.
CPC ......... *H01M 8/04029* (2013.01); *B01J 47/06* (2013.01); *H01M 8/0267* (2013.01)

(58) Field of Classification Search
CPC ... H01M 8/04029; H01M 8/0267; B01J 47/06
(Continued)

(56) References Cited

U.S. PATENT DOCUMENTS

2014/0248550 A1* 9/2014 Takemoto ................. C02F 1/42
429/434
2017/0263953 A1 9/2017 Ohira
2017/0368547 A1* 12/2017 Ohira ..................... B01J 47/024

FOREIGN PATENT DOCUMENTS

JP 2003-249249 A 9/2003
JP 2009219954 A * 10/2009
(Continued)

OTHER PUBLICATIONS

Morita, Akiji, Machine Translation of JP 2010-198796 A, Sep. 2010 (Year: 2010).*
(Continued)

*Primary Examiner* — Sean P Cullen
(74) *Attorney, Agent, or Firm* — Posz Law Group, PLC

(57) ABSTRACT

An ion exchanger for a cooling system of a fuel cell system includes: a communicating pipe part with the two ends thereof configured respectively to be connectable to predetermined piping arranged in the cooling system, and including a substantially linear shaped first flow path; and a storage case including a second flow path configured such that, when a part of the coolant introduced into the communicating pipe part branches from the coolant of the communicating pipe part and flows toward the second flow path, such partial coolant, after introduced into the second flow path, is allowed to flow therethrough and join again the remaining coolant of the communicating pipe part, while ion exchange resin is stored in the second flow path, wherein an introduction device for introducing the coolant into the second flow path is arranged in the inside of the communicating pipe part.

8 Claims, 5 Drawing Sheets

(58) Field of Classification Search
USPC .......................................................... 429/434
See application file for complete search history.

(56) References Cited

FOREIGN PATENT DOCUMENTS

| | | | |
|---|---|---|---|
| JP | 2010198796 A | * | 9/2010 |
| JP | 2011-083744 A | | 4/2011 |
| JP | 2012-187439 A | | 10/2012 |
| JP | 2017-159235 A | | 9/2017 |
| JP | 2017-176935 A | | 10/2017 |

OTHER PUBLICATIONS

Office action dated Jun. 11, 2019 issued in corresponding JP patent application No. 2016-133276 (and English translation thereof).

* cited by examiner

FUEL CELL COOLING SYSTEM ION EXCHANGER HAVING INTRODUCTION DEVICE FOR PARTITIONING COOLANT IN COMMUNICATING PIPE

CROSS-REFERENCE TO RELATED APPLICATION(S)

This application is based upon and claims the benefit of priority from Japanese Patent Application No. 2016-133276, filed on Jul. 5, 2016, the entire contents of which are incorporated herein by reference.

BACKGROUND

1. Field of the Invention

The invention relates to an ion exchanger for a cooling system of a fuel cell system.

2. Description of the Related Art

In a fuel cell system, when hydrogen and oxygen chemically react with each other in a fuel cell to generate power, the fuel cell generates heat. Thus, in the fuel cell system, there is provided a cooling system which circulates a coolant to maintain the fuel cell at the optimum temperature for power generation.

In the cooling system, when, due to acid generation caused by thermal degradation of the coolant and elution of ions from piping parts etc., ion concentration in the coolant increases, the conductivity of the coolant increases. This raises a fear that leakage can occur from the fuel cell to the outside through the coolant. Thus, there also arises a fear that the power generation efficiency of the fuel cell can decrease.

In view of this, conventionally, in the cooling system of the fuel cell system, in order to suppress an increase in the ion concentration in the coolant, there is provided an ion exchanger. The conventional ion exchanger is configured such that a coolant is allowed to pass through a case filled with ion exchange resin, thereby removing ions contained in the coolant (see, for example, JP-A-2011-83744).

However, in the conventional ion exchanger, since all the coolant to be introduced passes through an ion exchange resin filled part, pressure loss is very large. This raises a fear that the load of a pump to circulate the coolant can increase.

In view of this, recently, there has been known an ion exchanger configured such that the case includes a bypass flow path which allows a part of the introduced cooling liquid to bypass the ion exchange resin filled part (see, for example, JP-A-2012-187439).

However, in the ion exchanger according to JP-A-2012-187439, since an internal flow path through which the coolant flows from an inlet tube to an outlet tube, as a whole, is bent in a U-like shape or a crank-like shape, there remains still a fear that the pressure loss can increase. This is the same even if attention is paid only to the bypass flow path. Also, when the bypass flow path is provided in the case, there is a fear that the ion exchanger becomes larger in size.

Further, in the ion exchanger according to JP-A-2012-187439, the flow path section area of the internal flow path (mainly the ion exchange resin filled part) is much wider than the inlet tube, thereby raising a fear that the flow rate of the coolant inside the ion exchanger can become remarkably slow.

This raises a fear that, when air is mixed in the coolant, the air cannot be pushed away but can stay inside the ion exchanger, thereby causing various troubles such as degradation of the function of the ion exchange resin or degradation of the coolant.

SUMMARY

The invention is made in view of the above circumstances and thus it is one of main objects of the invention is to provide, for use in a cooling system of a fuel cell system, an ion exchanger which enables reduction of pressure loss and the like.

Description is given separately of the respective configurations suitable for solving the above problems. Here, as the need arises, additional description is given of operations and effects peculiar to the corresponding configurations.

According to a first aspect of the invention, there is provided an ion exchanger for a cooling system of a fuel cell system including: a communicating pipe part with the two ends thereof configured respectively to be connectable to predetermined piping arranged in the cooling system, and including a substantially linear shaped first flow path configured to allow coolant introduced from one side to pass therethrough to the other side; and a storage case including a second flow path configured such that, when a part of the coolant introduced into the communicating pipe part branches from the coolant of the communicating pipe part and flows toward the second flow path, such partial coolant, after introduced into the second flow path, is allowed to flow therethrough and join again the remaining coolant of the communicating pipe part, while ion exchange resin is stored in the second flow path, wherein an introduction device for introducing the coolant into the second flow path is arranged in the inside of the communicating pipe part.

According to the first aspect, due to provision of the communicating pipe part (first flow path), a part of coolant introduced into the ion exchanger is allowed to pass straight without through the ion exchange filled part and can be drawn from the ion exchanger at the shortest distance. Consequently, pressure loss can be reduced remarkably.

Also, since there is eliminated the need for provision of a bypass flow path bypassing the ion exchange filled part in order to reduce pressure loss and the length of the communicating pipe part can be reduced, the size of the ion exchanger can be reduced.

Here, in the first aspect, the term "substantially linear shaped" means that it does not include a flow path which bends in a U shape or an L shape and increases pressure loss remarkably. Thus, it is not limited to a perfect linear line but includes a shape which curves or bends gently to such a degree that can flow coolant smoothly.

Further, in the first aspect, there is included the second flow path into which, when a part of the coolant of the communicating pipe part branches therefrom, such partial coolant flows, and the ion exchange resin is stored here to remove ions contained in the coolant. With this configuration, due to provision of the first flow path, without considering an increase in pressure loss and the like, the second flow path can be formed thin and long. Thus, without increasing the flow path section area of the second flow path, more ion exchange resin can be stored. Consequently, a decrease in ion exchange efficiency can be suppressed and also a decrease in the flow velocity of the coolant passing through the second flow path can be suppressed.

As described in the above, supposing the flow velocity of the coolant decreases, when the air is mixed in the coolant, there is a fear that the air is not pushed away but stays within the ion exchanger. Particularly, when an area in which the coolant flows exists in the opposite direction to the buoyancy of the air, air buoyance overcomes coolant flow, thereby making it difficult to discharge the air on the flow of the coolant. Consequently, there arises a fear that various troubles such the degradation of the function of the ion exchange resin and the deterioration of the coolant can occur.

Specifically, for example, there is a fear that the flow of the coolant can be blocked by the pressure of the air to prevent the coolant from flowing to a part of the ion exchange resin. This raises a fear that there can occur troubles such as a decrease in ion exchange efficiency, an increase in ion concentration in the coolant, and the bias of deterioration degree of the ion exchange resin. Also, there is a fear that there can occur troubles as follows: for example, intervention of the air prevents the coolant from flowing properly to make unstable the operation of the pump of the cooling system; and, steam is generated within the ion exchanger to accelerate deterioration of parts made of resin material etc.

Meanwhile, since the ion exchange resin exists within the second flow path, the air can be discharged more easily. Normally, the faster the flow velocity of the coolant is, the more easily the air is discharged; and, the smaller the particle size of the air is, the more easily the air is discharged. In this respect, according to this configuration, since the ion exchange resin exists within the second flow path, when the coolant passes through the second flow path, it passes through a narrow clearance of the granular ion exchange resin, whereby the flow velocity of the coolant increases and the air is subdivided into small particles.

Here, generally, when the air is mixed in the coolant, air bleeding is possible through a reserve tank attached to the radiator. Thus, so long as the air can be swept without staying within the ion exchanger, a particular problem is hard to occur.

In addition, according to the first aspect, the introduction device for introducing the coolant into the second flow path (ion exchange resin filled part) is arranged in the communicating pipe part. This facilitates the introduction of the coolant into the second flow path, thereby enabling enhancement in ion exchange efficiency. Also, an increase in the size of the ion exchanger can be suppressed.

According to a second aspect of the invention, the ion exchanger according to the first aspect, further includes an introduction space where the ion exchange resin does not exist at least while the coolant is flowing, the introduction space being located at the neighborhood of an outlet of the second flow path.

When the coolant is introduced from the communicating pipe part into the second flow path, the flow of the coolant is forcibly bent by the introduction device, thereby raising a fear that the flow velocity and pressure of the coolant are caused to vary depending on positions. Accordingly, supposing the introduction space is not formed but the ion exchange resin is filled up to the inlet of the second flow path, there is a tear that the coolant cannot be introduced uniformly into the introduction surface of the ion exchange filled part.

Meanwhile, according to the second aspect, since, due to formation of the introduction space, the coolant can be made more uniformly within the introduction space, the coolant can be introduced more uniformly into the introduction surface of the ion exchange filled part.

Also, in a configuration in which the introduction space is not formed but the ion exchange resin is filled up to the inlet of the second flow path, when air is mixed in the coolant, there is a fear that the air is not introduced into the second flow path (ion exchange filled part) but can stay within the communicating pipe part (the neighborhood of the inlet of the second flow path).

Meanwhile, according to the second aspect, due to formation of the introduction space, while the air is collected within the introduction space, due to the water pressure of the coolant, the air can be introduced into the ion exchange resin filled part.

According to a third aspect of the invention, there is provided the ion exchanger according to the first aspect or the second aspect, wherein: the introduction device is a flow path partition wall configured to form an introduction flow path leading to the inlet of the second flow path; and the flow path partition wall includes a transverse wall formed along the flow path direction of the first flow path and a vertical wall formed in the downstream end of the transverse wall along a direction perpendicular to the flow path direction.

According to the third aspect, when the coolant flows into the first flow path, negative pressure can be generated in the neighborhood of the outlet of the second flow path. This can increase the flow velocity of the coolant flowing in the second flow path and also can enhance the derivation efficiency of the coolant from the second flow path.

According to a fourth aspect of the invention, there is provided the ion exchanger according to any one of the first to third aspects, wherein the communicating pipe part is provided in the lower portion of the storage case.

According to the fourth aspect, since the communicating pipe part is disposed in the lower portion of the storage case, when performing an operation to replace the ion exchange resin (cartridge), the coolant does not stay within the storage case, thereby facilitating the replacement operation.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

Figure 1:
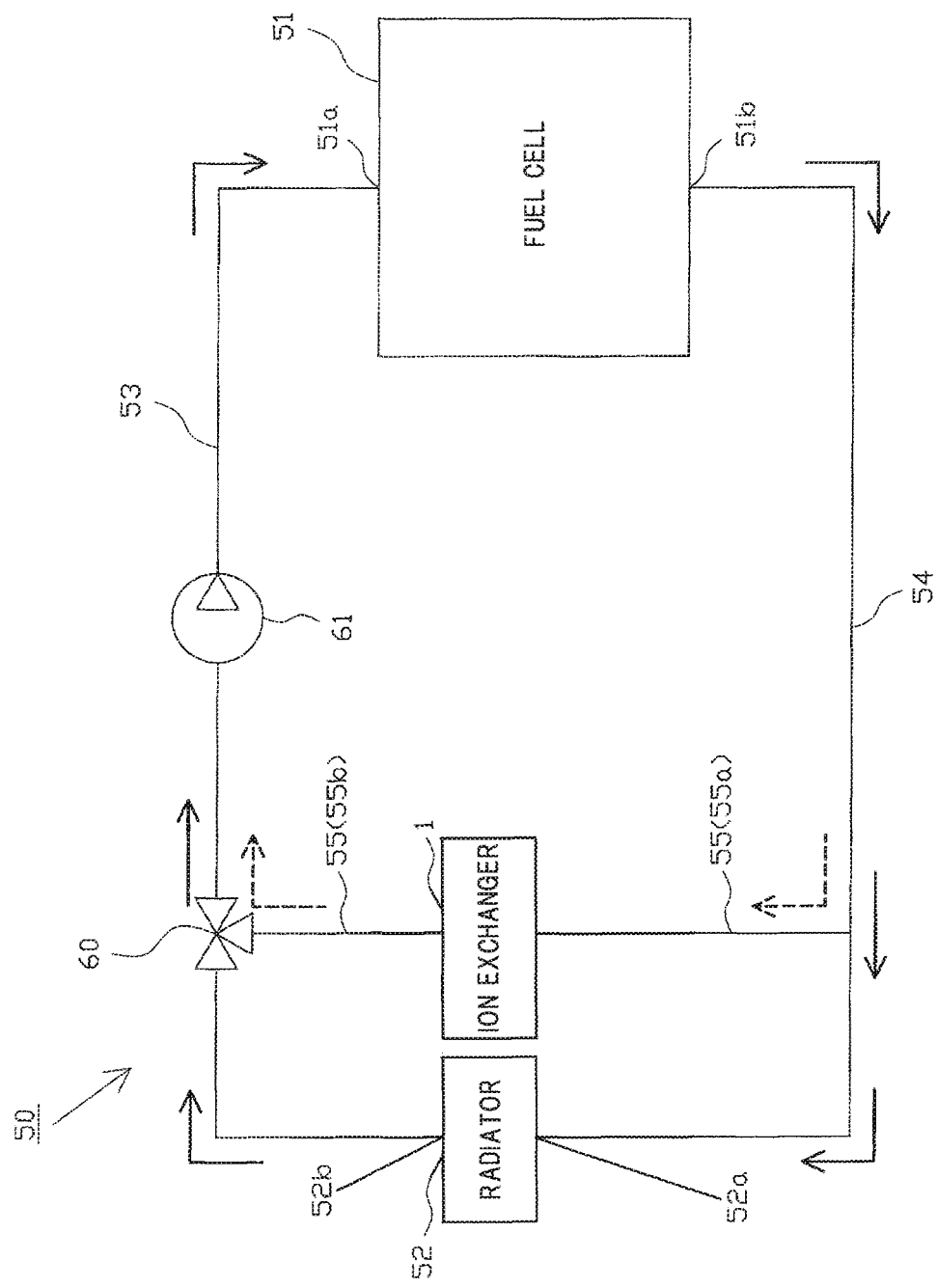
FIG. 1 is a schematic configuration view of a cooling system of a fuel cell system.

Description is given below of an embodiment of the invention with reference to the drawings. An ion exchanger of the invention is an apparatus which is used in a cooling system of a fuel cell system for use in, for example, a fuel cell vehicle. FIG. 1 is a schematic configuration view of a cooling system 50 of a fuel cell system on which an ion exchanger 1 (to be discussed later) is to be mounted.

As shown in FIG. 1, in the cooling system 50, a flow path for circulating coolant is mainly constituted of upstream piping 53 for connecting together an inlet 51a of a fuel cell 51 and an outlet 52b of a radiator 52, downstream piping 54 for connecting together an outlet 51b of the fuel cell 51 and an inlet 52a of the radiator 52, and a bypass piping 55 connected to the upstream piping 53 and downstream piping 54 in parallel to the radiator 52.

The ion exchanger 1 is installed in the bypass piping 55, while a three-way valve (three-way electromagnetic valve) 60 is installed in the connecting portion of the bypass piping 55 and upstream piping 53. Also, in such portion of the upstream piping 53 as exists between the three-way valve 60 and fuel cell 51, there is installed a pump 61 for circulating the coolant. Here, various kinds of control related to the cooling system 50 such as the switching control of the three-way valve 60 and the drive control of the pump 61 are carried out by a control unit (not shown).

Here, description is given first of the configuration of the fuel cell 51. A general fuel cell (a solid polymer type fuel cell) has a fuel cell stack in which multiple power generation cells are stacked. The power generation cell is configured such that a membrane electrode assembly (MEA), in which, on both sides of an electrolyte membrane, there are arranged an anode (a fuel electrode) and a cathode (an air electrode) respectively constituted of a catalyst layer and a gas diffusion layer, is sandwiched by a pair of separators.

Fuel gas (for example, hydrogen gas) is supplied to the anode of each power generation cell, while oxidizing gas (for example, air) is supplied to the cathode. When the fuel gas is supplied to the anode, hydrogen contained in the fuel gas reacts with the catalyst of the catalyst layer constituting the anode, thereby generating hydrogen ions. The hydrogen ions generated pass through the electrolyte membrane and react chemically with oxygen in the cathode. This chemical reaction generates power.

Each power generation cell generates heat with power generation in the fuel cell 51 (fuel cell stack), there is formed a flow path (not shown) for allowing the coolant to flow to the power generation cell. The coolant introduced into the power generation cell from the inlet 51a cools the power generation cell. And, after completion of heat exchange, the coolant is discharged from the outlet 51b.

Here, in this embodiment, as the coolant, there is used LLC (Long Life Coolant) containing ethylene glycol (antifreeze) in water. Therefore, when the power generation cell of the fuel cell 51 is cooled by the coolant, ethylene glycol contained in the coolant is thermally decomposed to generate an acid (for example, a formic acid), and this acid generates negative ions. Also, when the inner surface of the circulation flow path (such as the piping 53, 54, 55 etc.) of the coolant is corroded by the acid, positive ions are also generated. Thus, the coolant contains impurity ions in which the negative ions and positive ions coexist. Since the impurity ions have electric charge, the more the concentration of the impurity ions contained in the coolant increases, the more the conductivity of the coolant increases. Consequently, there is a fear that leakage can occur from the fuel cell 51 to the outside through the coolant.

Meanwhile, the radiator 52 is used to blow air using a blower fan (not shown) to cool the coolant warmed by the fuel cell 51. The coolant is radiated and cooled when passing through the inside of the radiator 52. In this embodiment, the flow of the coolant is controlled such that the temperature of the fuel cell 51 provides the optimum temperature (for example, 65° C.).

The three-way valve 60 is used to switch the flow path in which the coolant flows. More specifically, when the temperature of the fuel cell 51 is below the optimum temperature, a first inlet (on the radiator 52 side) of the three-way valve 60 is closed, and a second inlet (on the bypass piping 55 side) and an outlet (on the pump 61 side) are opened. Thus, the coolant is driven by the pump 61 to circulate between the fuel cell 51 and bypass piping 55. Meanwhile, when the temperature of the fuel cell 51 exceeds the optimum temperature, the first inlet and outlet of the three-way valve 60 are opened, and the second inlet is closed. Thus, the coolant is driven by the pump 61 to circulate between the fuel cell 51 and radiator 52, thereby cooling the fuel cell 51.

Therefore, when the temperature of the fuel cell 51 is below the optimum temperature, all of the coolant within the cooling system 50 always circulates through the bypass piping 55. In this case, since the coolant passes through the ion exchanger 1, impurity ions contained in the coolant are partially removed. This suppresses an increase in the conductivity of the coolant.

Figure 2:
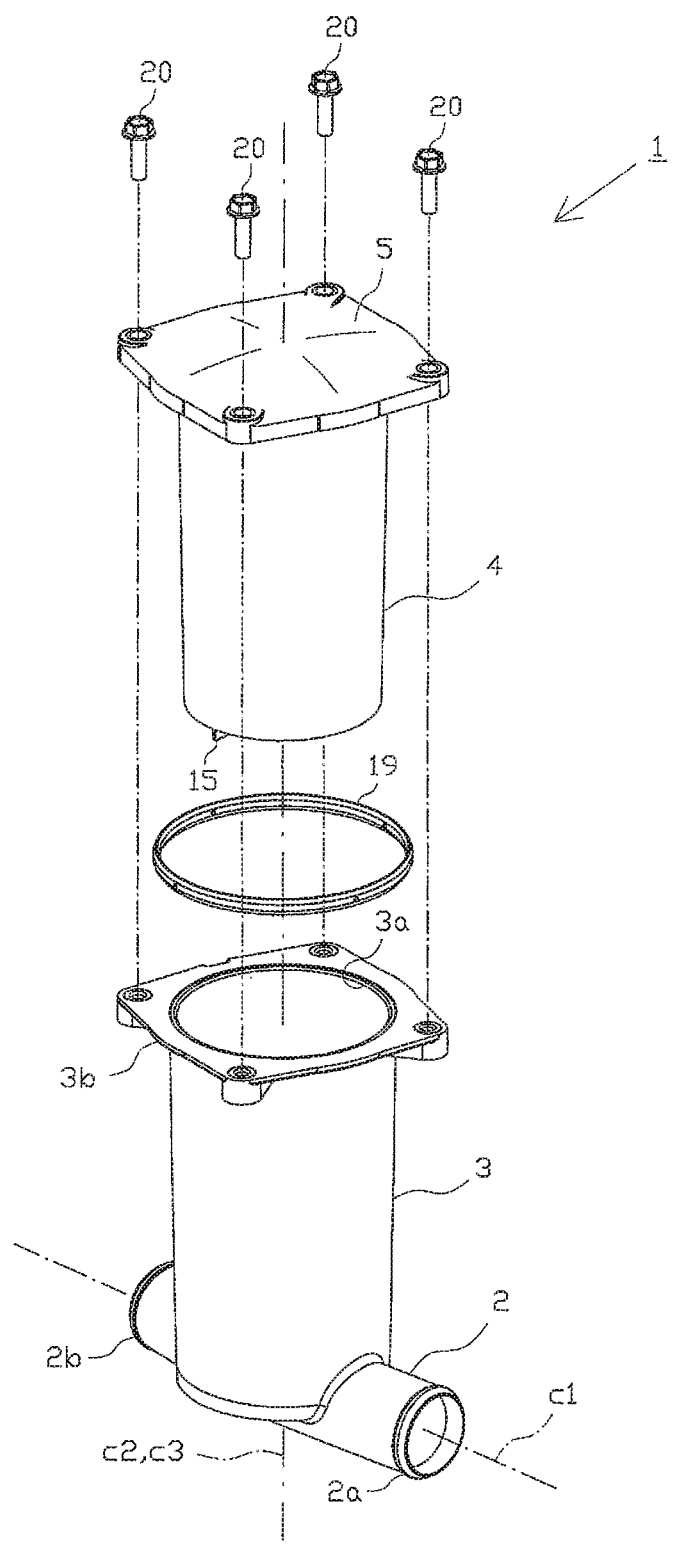
FIG. 2 is an exploded perspective view of an ion exchanger.
Figure 3:
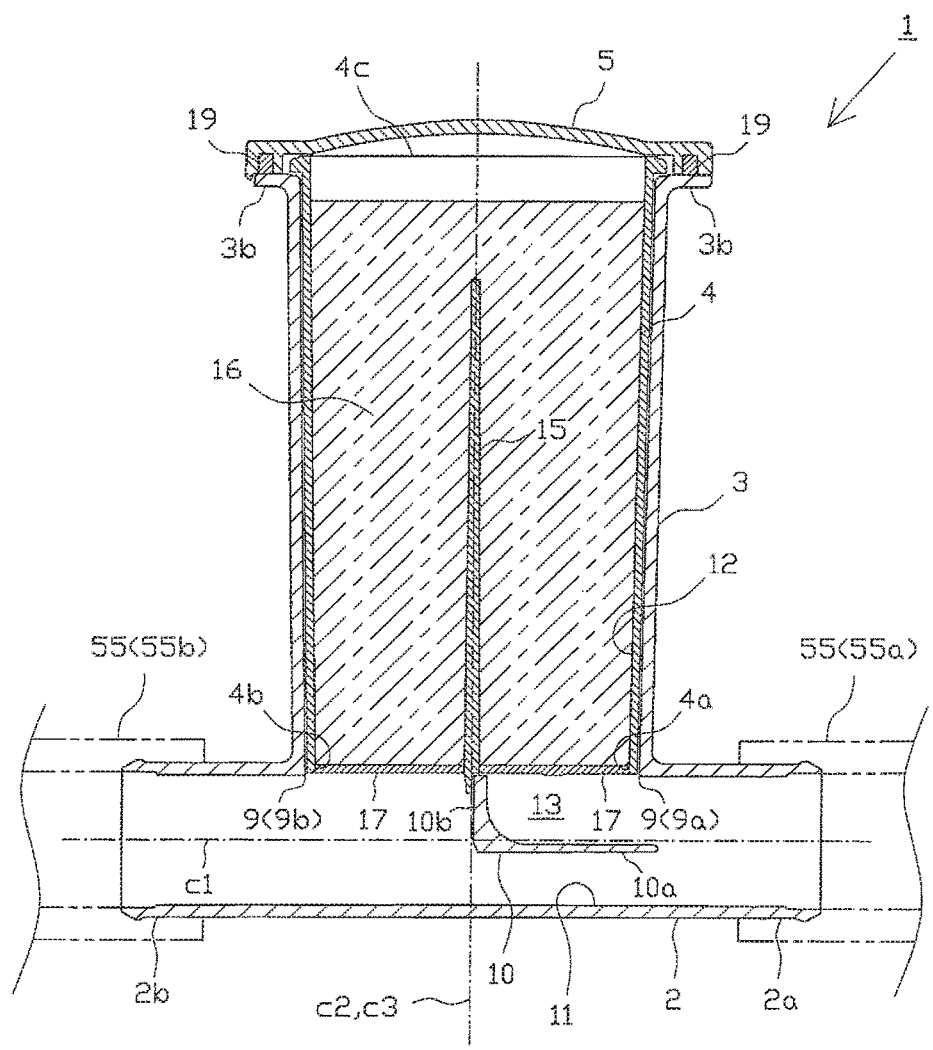
FIG. 3 is a section view of an ion exchanger in a state where coolant is not flowing.
Figure 4:
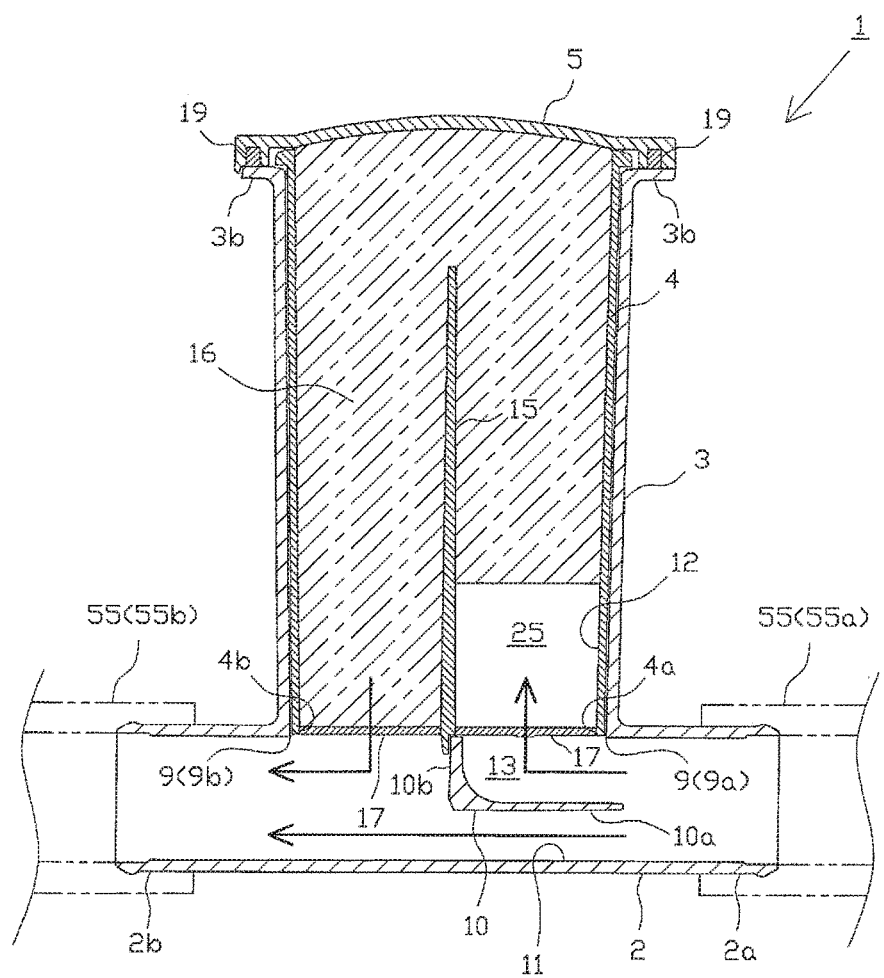
FIG. 4 is a section view of an ion exchanger in a state where coolant is flowing.

The configuration of the ion exchanger 1 is specifically described below with reference to FIGS. 2 to 4. FIG. 2 is a perspective view of the ion exchanger 1. FIG. 3 is a section view of the ion exchanger in a state where coolant is not flowing, and FIG. 4 is a section view of the ion exchanger in a state where coolant is flowing.

The ion exchanger 1 includes a communicating pipe part 2 to be connected to the bypass piping 55, an outer cylinder part 3 formed integrally with the communicating pipe part 2, an inner cylinder part 4 to be stored into the outer cylinder part 3, and a cover part 5 for covering the outer cylinder part 3. The outer cylinder part 3, inner cylinder part 4 and cover part 5 constitute a storage case.

The communicating pipe part 2 has a substantially cylindrical shape which is formed linearly as a whole. It is connected to the bypass piping 55 such that the central axis thereof extends along a substantially horizontal direction.

It includes an inlet side joint portion 2a capable of connecting the upstream bypass piping 55a thereto in one end thereof in the longitudinal direction, and an outlet side joint portion 2b capable of connecting the downstream bypass piping 55b thereto in the other end thereof in the longitudinal direction. An opening of the inlet side joint portion 2a constitutes an inlet of the communicating pipe part 2, while an opening of the outlet side joint portion 2b constitutes an outlet of the communicating pipe part 2.

The outer cylinder part 3 projects upward from the communicating pipe part 2 and has a bottomed cylindrical shape with an upper surface opened. However, the communicating pipe part 2 and outer cylinder part 3 communicate with each other in their respective insides through an opening 9.

The central axis C1 of the communicating pipe part 2 and the central axis C2 of the outer cylinder part 3 are perpendicular to each other and, in a state where the ion exchanger 1 is installed in the bypass piping 55, the central axis C2 of the outer cylinder part 3 extends substantially along the vertical direction.

Within the communicating pipe part 2, there is formed a flow path partition wall 10 corresponding to the opening 9. The flow path partition wall 10 of this embodiment is formed integrally with the communicating pipe part 2.

The flow path partition wall 10 is used to branch the flow path into a first flow path 11 for passing the coolant introduced from the inlet of the communicating pipe part 2 to the outlet and a second flow path 12 (to be discussed later) through which, when a part of the coolant of the communicating pipe part 2 branches therefrom, such partial coolant is allowed to flow. That is, due to formation of the flow path partition wall 10, an introduction flow path 13 connected to the inlet of the second flow path 12 is formed in the inside of the communicating pipe part 2. Thus, the flow path partition wall 10 (introduction flow path 13) constitutes an introduction device of this embodiment.

The flow path partition wall 10 includes a substantially horizontal plate-shaped transverse wall 10a formed along the central axis C1 of the communicating pipe part 2, and a substantially flat plate-shaped vertical wall 10b formed to project upward (toward the opening 9) from the downstream end of the transverse wall 10a along the central axis C2 of the outer cylinder part 3, while the flow path partition wall 10 is formed to have a substantially L shaped section as a whole. However, the surface of the connecting portion of the transverse wall 10a and vertical wall 10b on the introduction flow path 13 side is a substantially arc-shaped curved surface so as to facilitate the flow of the coolant to the second flow path 12.

The inner cylinder part 4 has a substantially cylindrical shape as a whole and is stored within the outer cylinder part 3 such that the central axis C3 thereof is superposed on the central axis C2 of the outer cylinder part 3.

In the inner cylinder part 4, there is formed a partition wall 15 which partitions the inside of the inner cylinder part 4 into two areas. The partition wall 15 is formed along a plane which is perpendicular to the central axis C1 the communicating pipe part 2 and contains the central axis C3. However, the upper end of the partition wall 15 is situated at a position lower than the upper end of the inner cylinder part 4, and the two areas communicate with each other in the upper portion of the inner cylinder part 4.

Meanwhile, the lower end of the partition wall 15 projects more downward than the lower end of the inner cylinder part 4 and, in a state where the inner cylinder part 4 is stored within the outer cylinder part 3, can be engaged with the upper end of the vertical wall 10b of the flow path partition wall 10.

Thus, the opening 9 of the communicating pipe part 2 is partitioned into two upstream and downstream sides. And, the communicating pipe part 2 and inner cylinder part 4 communicate with each other through the upstream side lower opening 4a of the inner cylinder part 4 and the upstream side opening 9a of the communicating pipe part 2, and also through the downstream side lower opening 4b of the inner cylinder part 4 and the downstream side opening 9b of the communicating pipe part 2.

This configuration forms the second flow path 12 which has an inverted U bent shape as a whole and in which a part of the coolant is introduced from the communicating pipe part 2 through the introduction flow path 13, is allowed to pass through the inside of the inner cylinder part 4 and is allowed to return again to the communicating pipe part 2. Here, the upstream side lower opening 4a of the inner cylinder part 4 constitutes an inlet of the second flow path 12, and the downstream side lower opening 4b of the inner cylinder part 4 constitutes an outlet of the second flow path 12.

The inner cylinder part 4 (second flow path 12) stores therein granular ion exchange resin 16 capable of removing impurity ions contained in the coolant by ion exchange. The ion exchange resin 16 is known resin and, in this embodiment, anion exchange resin capable of absorbing negative ions and cation exchange resin capable of absorbing positive ions are stored in a mixed state.

A mesh 17 is mounted on the lower openings 4a and 4b of the inner cylinder part 4. The mesh 17 is used to allow passage of the coolant and prevent passage of the ion exchange resin 16.

The peripheral edge of the upper opening 4c of the inner cylinder part 4 is fixed to the inner surface (back surface) of the cover part 5 by a predetermined bonding method. Thus, the inner cylinder part 4 and cover part 5 are united, whereby the ion exchange resin 16 can be treated as a replacement cartridge with the ion exchange resin 16 enclosed therein. Also, the inner surface of the cover part 5 constitutes a part of the second flow path 12.

Meanwhile, the cover part 5 is removably fixed to the outer cylinder part 3 and, in this embodiment, it is fastened to a flange 3b formed in the peripheral edge of the upper opening 3a of the outer cylinder part 3 through a packing 19 by multiple bolts 20.

Next, description is given of the operation of the ion exchanger 1 of this embodiment configured as above.

The coolant introduced into the communicating pipe part 2 through the upstream bypass piping 55a is branched by the flow path partition wall 10 and a part thereof is introduced through the introduction flow path 13 to the second flow path 12. The remaining coolant is introduced through the first flow path 11 to the outlet and is discharged to the downstream bypass piping 55b.

Here, as shown in FIG. 4, in this embodiment, while the coolant is flowing, the ion exchange resin 16 is forced to flow downstream within the inner cylinder part 4, thereby forming, in the neighborhood of the inlet of the second flow path 12 (the lower opening 4a of the inner cylinder part 4), an introduction space 25 where the ion exchange resin 16 does not exist. Therefore, the coolant the flow of which is bent upward by the introduction flow path 13 is first forced to enter the introduction space 25 through the inlet of the second flow path 12 (the lower opening 4a of the inner cylinder part 4).

Under the configuration that the flow of the coolant is forcibly bent by the introduction flow path 13, supposing the introduction space 25 is not formed but the ion exchange resin 16 is filled to the inlet of the second flow path 12, there is a fear that the coolant is not introduced uniformly to the introduction surface of the ion exchange resin 16. Also, supposing air is mixed in the coolant, there is a fear that the air is not introduced to the second flow path 12 but can stay within the introduction flow path 13.

Meanwhile, in this embodiment, due to formation of the introduction space 25, the coolant is made more uniform within the introduction space 25, whereby the coolant can be introduced more uniformly into the introduction surface of the ion exchange resin 16. Also, when air is mixed in the coolant, the air can be collected within the introduction space 25, thereby enabling more positive introduction of the air to the ion exchange resin 16.

The coolant having passed through the introduction space 25 passes through the clearance of the ion exchange resin 16 and flows upward along the second flow path 12. In this case, when air is mixed in the coolant, the air is subdivided into sizes that can pass between the ion exchange resins 16 before it is pushed away.

After then, the coolant U turns in the upper end of the partition wall 15 along the second flow path 12, and flows downward toward the outlet of the second flow path 12 (the lower opening 4b of the inner cylinder part 4). During this movement, impurity ions contained in the coolant are removed by the ion exchange resin 16.

And, the coolant is discharged from the outlet of the second flow path 12 to the communicating pipe part 2. The coolant discharged in this manner to the communicating pipe part 2 joins the coolant existing within the communicating pipe part 2, is introduced to the outlet of the communicating pipe part 2, and is discharged to the downstream bypass piping 55*b*.

Here, in this embodiment, the vertical wall 10*b* of the flow path partition wall 10 is formed to be perpendicular to the flow path direction of the first flow path 11. Therefore, when the coolant flows to the first flow path 11, negative pressure can be generated in the vicinity of the outlet of the second flow path 12. This can increase the flow velocity of the coolant flowing in the second flow path 12 and can enhance the derivation efficiency of the coolant flowing from the outlet of the second flow path 12.

As has been described heretofore specifically, according to this embodiment, due to provision of the communicating pipe part 2 (first flow path 11), a part of the coolant introduced into the ion exchanger 1 can be made to pass straight without passing through the inner cylinder part 4 (the ion exchange resin 16 filled part), and can be derived from the ion exchanger 1 at the shortest distance. Consequently, pressure loss can be reduced extremely.

Thus, this can eliminate the need to provide a bypass flow path bypassing the inner cylinder part 4 (the ion exchange resin 16 filled part) in the inside of the outer cylinder part 3 for reduction of pressure loss, and further can reduce the length of the communicating pipe part 2, thereby enabling reduction of the size of the ion exchanger 1.

Further, in this embodiment, there is provided the second flow path 12 in which a part of the coolant is allowed to flow while branching from the communicating pipe part 2, and the ion exchange resin 16 is stored in the second flow path 12 to thereby remove ions contained in the coolant. In this embodiment, due to provision of the communicating pipe part 2 (first flow path 11), without considering an increase in pressure loss, etc., the second flow path 12 can be formed fine and long. Thus, without increasing the flow path section area of the second flow path 12, more ion exchange resin can be stored. Consequently, while suppressing a decrease in ion exchange efficiency, a decrease in the flow velocity of the coolant passing through the second flow path 12 can be suppressed.

Also, since the second flow path 12 is made thin and long to increase the flow velocity of the coolant in this manner, air mixed into the coolant can be discharged more easily. Particularly, in this embodiment, since, when passing through the second flow path 12, the coolant passes through the narrow clearance of the granular ion exchange resin 16, the flow velocity of the coolant is increased and the air is subdivided into small grains, the air can be discharged more easily.

In addition, in this embodiment, the flow path partition wall 10 (introduction flow path 13) for introduction of the coolant into the second flow path 12 is disposed within the communicating pipe part 2. This can facilitate introduction of the coolant into the second flow path 12 and can enhance ion exchange efficiency. Also, an increase in the size of the ion exchanger 1 can be suppressed.

Also, in this embodiment, since the communicating pipe part 2 is disposed in the lower portion of the outer cylinder part 3, when performing the operation to replace the ion exchange resin cartridge (inner cylinder part 4 and cover part 5), the coolant does not stay in the outer cylinder part 3, thereby enabling facilitation of the replacing operation.

Here, the invention is not limited to the described contents of the above embodiment but, for example, may be enforced as follows. Of course, other applied examples and changes than the following examples are also possible.

(a) In the above embodiment, the invention is embodied as an ion exchanger for use in a cooling system of a fuel cell system in a fuel cell car. However, the invention is not limited to this but can also be embodied as an ion exchanger for use in a cooling system of a fuel cell system for power generation in factories and households.

(b) The configuration of the cooling system 50 including the installation position of the ion exchanger 1 and the like is not limited to the above embodiment. For example, the ion exchanger 1 may also be installed in a cooling system capable of controlling the flow rate of the coolant to the radiator 52 or bypass piping 55. Also, there may also be provided second bypass piping which branches from the bypass piping 55, and the ion exchanger 1 may be installed in the second bypass piping.

(c) In the above embodiment, there is employed the linearly formed, substantially cylindrical-shaped communicating pipe part 2. However, the configuration of a communicating pipe part is not limited to this. For example, there may also be employed a communicating pipe part having a shape gently curved or bent to such a degree that allows the coolant to flow smoothly.

(d) In the above embodiment, as an introduction device for introducing the coolant to the second flow path 12, the flow path partition wall 10 is formed integrally with the communicating pipe part 2. The introduction device is not limited to this but another configuration may also be employed.

Figure 5:
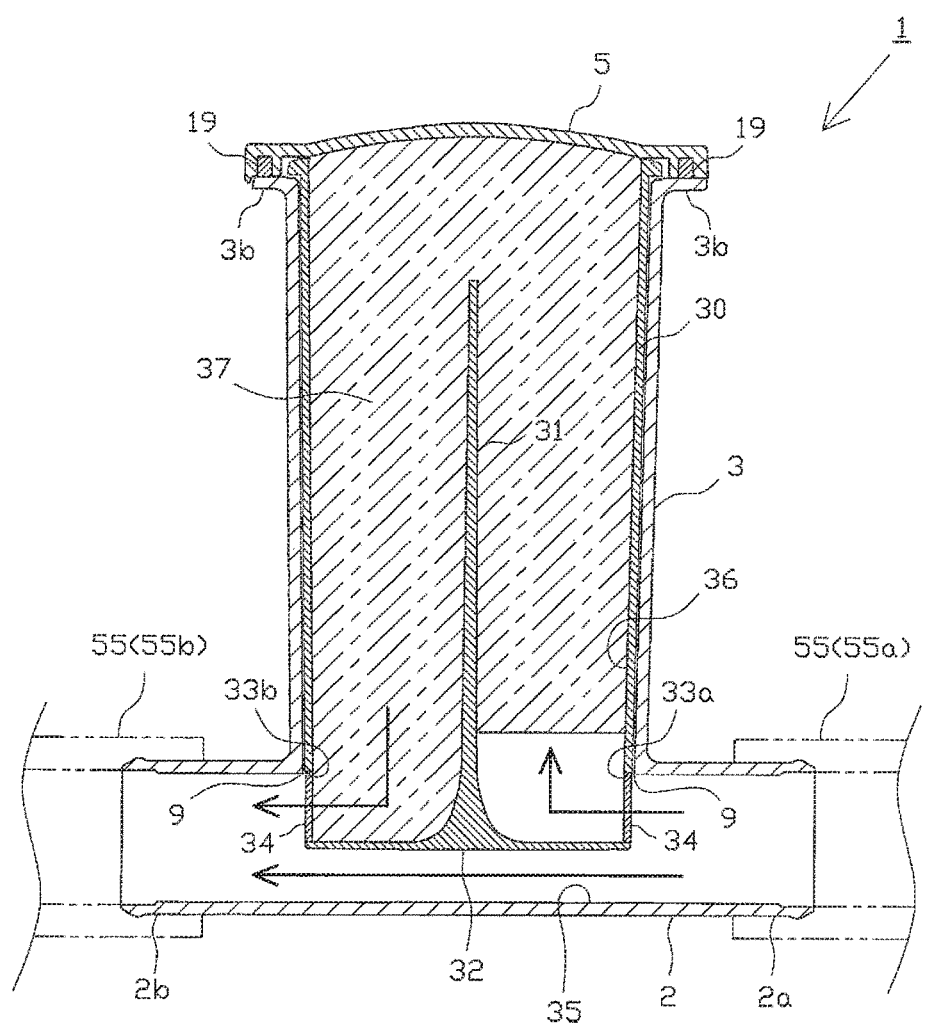
FIG. 5 is a section view of an ion exchanger according to another embodiment.

For example, as shown in FIG. 5, the flow path partition wall 10 may be omitted from the communicating pipe part 2, and there may be employed an inner cylinder part 30 different from the inner cylinder part 4. The inner cylinder part 30 has a bottomed cylindrical shape and is stored within the outer cylinder part 3. However, the lower end of the inner cylinder part 30 is projected through the opening 9 into the communicating pipe part 2.

The inner cylinder part 30 includes a partition wall 31 which partitions the inside of the part 30 to two areas. The upper end of the partition wall 31 is situated at a lower position than the upper end of the part 30, and the two areas communicate with each other in the upper portion of the inner cylinder part 30. Meanwhile, the lower end the partition wall 31 is continuously connected to the bottom 32 of the inner cylinder part 30.

The outer peripheral surface of the inner cylinder part 30 exposed into the communicating pipe part 2 has a side opening 33*a* on the upstream side thereof, and a side opening 33*b* on the downstream side. Meshes 34 are mounted on the side openings 33*a* and 33*b*, respectively.

And, a first flow path 35 is formed between the bottom 32 of the inner cylinder part 30 and the inner wall of the communicating pipe part 2. Meanwhile, there is formed a second flow path 36 configured such that a part of the coolant is introduced therein from the communicating pipe part 2 through the side opening 33*a* and is allowed to pass through the inside of the inner cylinder part 30 and to return again to the communicating pipe part 2 through the side opening 33*b*. An ion exchange resin 37 is stored in the part 30 (the second flow path 36). In this embodiment, an introduction device is constituted by the side opening 33*a* which constitutes the inlet of the second flow path 36.

And, there may also be employed a configuration capable of controlling the amount of projection of the inner cylinder part 30 into the communicating pipe part 2, and thus there may also be employed a configuration capable of controlling the flow rate of the coolant to be introduced to the second flow path 36.

(e) The flow path partition wall 10 according to the above embodiment includes the transverse wall 10a formed along the flow path direction of the first flow path 11 and the vertical wall 10b formed in the downstream end of the transverse wall 10a along a direction perpendicular to the above flow path; and, as a whole, it is formed in a shape having a substantially L-like section.

This is not limitative but, for example, there may also be employed a flow path partition wall which is curved with an arc-shaped section so as to enable facilitation of flow of the coolant toward the inlet of the second flow path 12.

(f) In the above embodiment, there is formed the introduction space 25 configured such that, while the coolant is flowing, the ion exchange resin 16 is forced to flow downstream within the inner cylinder part 4 and thus the ion exchange resin 16 does not exist near the inlet of the second flow path 12 (the lower opening 4a of the inner cylinder part 4).

However, this is not limitative, there may also be employed a configuration in which the mesh 17 is mounted more downstream than the lower opening 4a of the inner cylinder part 4 and an introduction space is formed earlier than when the coolant flows.

(g) The configuration of the outer cylinder part 3, inner cylinder part 4 and cover part 5 cooperatively serving as the storage case for storing the ion exchange resin 16 is not limited to the above embodiment, but other configuration may be employed.

For example, in the above embodiment, the second flow path 12 is formed in a shape which is bent in an inverted U-like manner. However, there may also be employed a second flow path having a different shape from this. Also, the outer cylinder part 3 and inner cylinder part 4 may not be formed in a cylindrical shape but they may be configured in an elliptical cylindrical shape or in a square cylindrical shape.

Also, in the above embodiment, the inner cylinder part 4 is fixed to the inner surface of the cover part 5 by a given bonding method, whereby the inner cylinder part 4 and cover part 5 can be treated integrally as a single exchange cartridge in which the ion exchange resin 16 is enclosed.

However, this is not limitative but, for example, there may also be employed a configuration in which the inner cylinder part 4 and cover part 5 are removably configured and, when replacing the cartridge, only the inner cylinder part 4 is replaced or only the ion exchange resin 16 within the inner cylinder part 4 is replaced; or, a configuration in which the inner cylinder part 4 and cover part 5 are not assembled to each other but they are treated separately.

Also, the assembling configuration of the cover part 5 and outer cylinder part 3 is not limited to the above embodiment but other configuration may also be employed. For example, there may be employed a configuration in which a male screw portion is formed in the outer periphery of the outer cylinder part 3, a female screw portion is formed in the inside of the cover part 5, and the two parts are then screw engaged with each other.

(h) In the above embodiment, the ion exchanger 1 is installed in such a manner that the central axis C1 of the communicating pipe part 2 extends substantially along the horizontal direction and the central axis C2 of the outer cylinder part 3 (the central axis C3 of the inner cylinder part 4) extends substantially along the vertical direction.

This is not limitative but, for example, the ion exchanger 1 may also be installed in such a manner that the central axis C1 of the communicating pipe part 2 extends substantially along the vertical direction and the central axis C2 of the outer cylinder part 3 (the central axis C3 of the inner cylinder part 4) extends substantially along the horizontal direction.

Also, the ion exchanger 1 may also be installed in such a manner that the central axis C1 of the communicating pipe part 2 extends substantially along the horizontal direction and the central axis C2 of the outer cylinder part 3 (the central axis C3 of the inner cylinder part 4) extends substantially along the horizontal direction.

Also, the ion exchanger 1 may also be installed in such a manner that the central axis C1 of the communicating pipe part 2 and the central axis C2 of the outer cylinder part 3 (the central axis C3 of the inner cylinder part 4) are inclined with respect to the horizontal direction and vertical direction.

Also, the ion exchanger 1 may also be installed in such a manner that the communicating pipe part 2 is situated on the upper side and the outer cylinder part 3 (the inner cylinder part 4) is situated on the lower side.

What is claimed is:

1. An ion exchanger for a cooling system of a fuel cell system comprising:
   a first flow path having two ends configured respectively to be connectable to predetermined piping arranged in the cooling system, the first flow path having a substantially linear shape between the two ends and being configured to allow coolant introduced from one side to pass therethrough to another side; and
   a storage case including a second flow path configured such that, when a part of the coolant introduced into the first flow path branches from the coolant of the first flow path and flows toward the second flow path, such partial coolant, after introduced into the second flow path, is allowed to flow therethrough and join again the remaining coolant of the first flow path, while ion exchange resin is stored in the second flow path, wherein
   an introduction device for introducing the coolant into the second flow path is arranged in an inside of the first flow path, the introduction device including a flow path partition wall configured to form an introduction flow path leading to an inlet of the second flow path, the flow path partition wall including a transverse wall formed along a flow path direction of the first flow path and a vertical wall formed in a downstream end of the transverse wall, the vertical wall formed along a direction perpendicular to the flow path direction.

2. The ion exchanger according to claim 1, wherein
   the first flow path is provided in a lower portion of the storage case.

3. The ion exchanger according to claim 1, wherein
   a connecting portion of the transverse wall and the vertical wall on the introduction flow path side provides an arc-like curved surface.

4. The ion exchanger according to claim 1, further comprising
   an introduction space where the ion exchange resin does not exist at least while the coolant is flowing, the introduction space being located at an inlet side of the second flow path.

5. The ion exchanger according to claim 1, further comprising
   an inner cylinder part to be stored into the storage case and a cover part configured to cover the storage case, wherein
   the inner cylinder part and the cover part are united together to constitute a replacement cartridge with the ion exchange resin sealed therein.

6. The ion exchanger according to claim 5, wherein
the lower end of the inner cylinder part projects into the first flow path; and
an opening is formed in an outer peripheral surface of the inner cylinder part exposed into the first flow path.

7. The ion exchanger according to claim 5, wherein
the inner cylinder part includes a partition wall configured to form an inverted U-shaped flow path within the inner cylinder part.

8. An ion exchanger for a cooling system of a fuel cell system comprising:

a storage case including an outer cylindrical part, an inner cylindrical part having a common central axis with the outer cylindrical part and storing ion exchange resin inside the outer cylindrical part, a cover part covering the outer cylindrical part, and a partition wall formed as a plane along the common central axis, the plane of the partition wall extending across the inside of the inner cylindrical part and partitioning the inside of the inner cylindrical part into two areas, the two areas communicating with each other in an upper portion of the inner cylindrical part, and a communicating pipe part formed integrally with the outer cylindrical part in a lower portion of the storage case, the communication pipe part forming a first flow path and having two ends configured respectively to be connectable to predetermined piping arranged in the cooling system, the first flow path having a substantially linear shape between the two ends and being configured to allow coolant introduced from one side to pass therethrough to another side; and an introduction device arranged inside the communication pipe part and configured to branch a part of the coolant from the first flow path into a second flow path, wherein the storage case forms the second flow path and is configured such that the part of the coolant branched from the first flow path flows along the second flow path which includes the inner cylindrical part and through the two areas of the inner cylindrical part storing the ion exchange resin, and thereafter the part of the coolant branched from the first flow path returns to the coolant in the first flow path in the communication pipe part.

* * * * *